Feb. 19, 1952 J. S. TROTH 2,586,744
APPARATUS FOR CUTTING AND SCORING BLANKS
Filed June 29, 1949
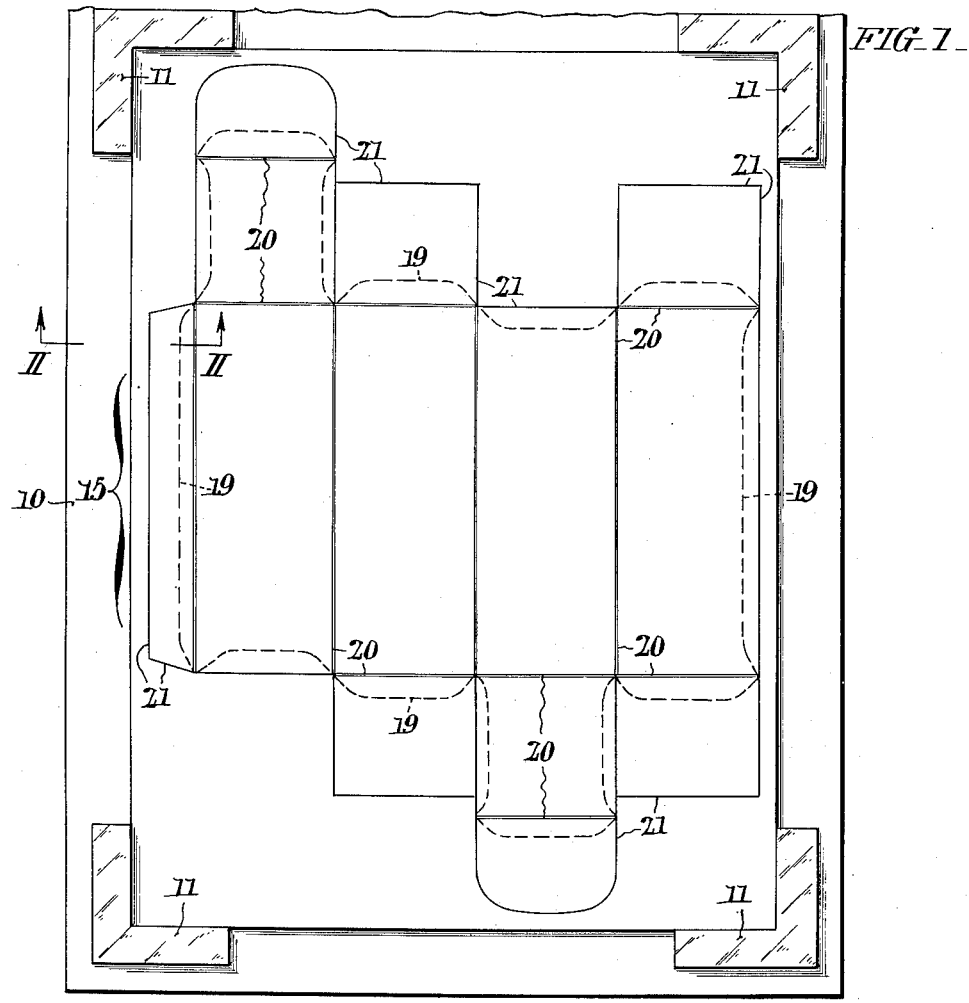
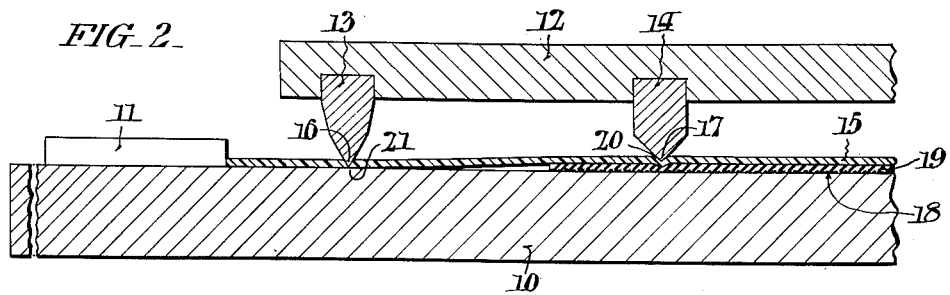
INVENTOR:
John Shipley Troth,
BY Paul & Paul
ATTORNEYS.

Patented Feb. 19, 1952

2,586,744

UNITED STATES PATENT OFFICE 2,586,744

APPARATUS FOR CUTTING AND SCORING BLANKS

John Shipley Troth, Wayne, Pa., assignor, by mesne assignments, to Robert Gair Company Inc., New York, N. Y., a corporation of Delaware Application June 29, 1949, Serial No. 102,106

3 Claims. (Cl. 93—58.3)

This invention relates to improvements in apparatus and process for the cutting and scoring of plastic blanks.

It has heretofore been the practice to perform scoring operations on plastic blanks, such as container blanks, so as to make the blanks foldable along pre-determined lines, by applying heated scoring blades under pressure to a plastic sheet positioned on a steel plate or bed. The use of such heated scoring blades has, unfortunately, limited the type of material from which scored plastic blanks may be manufactured to those materials which will withstand the action of heat. The use of cold scoring blades has, in the past, proved to be highly impractical, except in special instances, due to the tendency of most plastic materials to crack along the folding lines thus formed. This difficulty has been particularly serious in the case of relatively low cost plastic materials such as cellulose acetate. It has long been desired to develop a single, easy and inexpensive process of scoring plastic sheet material so as to make the material foldable along pre-determined lines which will eliminate the tendency of the plastic material to crack during the scoring or folding operation and which in addition may be used with a wide variety of plastic materials in sheet form.

One object of this invention is to provide an improved process of cutting and scoring plastic blanks which may be used with a wide variety of plastic materials.

Another object of this invention is to provide an improved process of scoring plastic blanks which will not cause the plastic material to crack along the folding lines produced by the scoring blades.

Another object of this invention is to provide improved apparatus for scoring plastic materials which will be simple, easy and inexpensive to use, operate and maintain.

Other objects and advantages of this invention will be apparent during the course of the following description.

In the accompanying drawings, forming a part of this specification, and in which like numerals are employed to designate like parts throughout.

Fig. 1 is a plan view illustrating a simple preferred form of apparatus wherein this new process may be practiced and Fig. 2 is a fragmentary, vertical, transverse section taken on line II—II of Fig. 1.

In the drawings, wherein for the purpose of illustration is shown a preferred embodiment of this invention, two cooperating members 10 and 12 are shown which are adapted to be moved relatively together and apart under pressure to accomplish the results hereinafter described. Since any of the mechanisms well known to the art, as for instance a platen press, may be utilized for applying pressure to the members 10 and 12, such mechanism is omitted from the showing in the application as not pertinent to an understanding of the invention. The member 10 may be considered as a bed or platen, preferably made of steel, and the number 12 may be termed a head. Secured to the outer edges of the bed 10 are a plurality of retaining stops 11, preferably made of soft rubber, which are adapted to hold a plastic sheet 15 in position for the cutting and scoring operations.

Mounted on the head 12 are cutting blades 13 and scoring blades 14. The cutting blades 13 are preferably made of steel and are formed with sharp cutting edges 16 which are designed to penetrate the plastic material and cause a cutting or separation thereof along the line of the cutting edges. The scoring blades 14 are likewise preferably made of steel and are formed with scoring edges 17 which are designed to score the plastic material without cutting through it.

Mounted on the upper face of the bed 10 is a relatively thin resilient mat 19 preferably made of rubber, rubberized fabric or equivalent flexible material having capacity to yield under pressure. Mat 19 has a continuous plane upper surface which faces head member 12, and is depressible under the influence of scoring blades 14 when the scoring blades 14 approach bed member 10. The plastic sheet 15 is positioned upon the resilient mat 19 as illustrated in Fig. 2. The mat 19 is of such configuration as to permit it to separate plastic sheet 15 from the upper face 18 of bed 10 along folding lines 20, where the scoring edge 17 bears against the sheet 15, when the bed 10 and the head 12 are in a position of closest proximity. Mat 19 is also shaped and positioned to permit plastic sheet 15 to rest in direct contact with the upper face 18 of bed 10 along cutting lines 21 which are located where cutting edges 16 of blades 13 penetrate through the plastic sheet 15.

The process of cutting and scoring the blank is as follows:

The head 12 and the bed 10 are moved relatively apart. Thereupon mat 19 is correctly formed and positioned upon face 18 of bed 10 so as to support plastic sheet 15 along the lines 20 where the scoring blades 14 will bear against sheet 15 and not along the lines 21 where the cutting blades 13 operatively contact the plastic sheet 15. This can be accomplished by first temporarily attaching a thin, flexible, resilient mat to the bed by means of an adhesive tape or the like. The cutting and scoring blades of the head are then brought into contact with the mat under pressure. This contact not only cuts the mat but also provides indications on the mat as to the location of the scoring lines. These indications are then used as a guide in the cutting of the mat to its final shape as indicated by the broken lines in Fig. 1. It will be noted that mat 19 is cut in such a way as to insure a substantial clearance between the cutting blades 13 and the mat 19 along the cutting lines 21. This clearance is sufficient to provide a flat contact between plastic sheet 15 and the bed 10 along each of the cutting lines as shown in Fig. 2. This feature of the present invention is of importance in obtaining the desired results since a flat surface contact is required along the cutting lines in order to avoid any bending except where desired along the folding lines. The cutting lines ultimately define the tucks and flaps of the finished container blank. If the outline of the mat is permitted to extend to or almost to the cutting lines, a bending effect is induced along the cutting lines just prior to the passage of the cutting blades through the plastic material. The bend thus induced is retained in the final form of the container blank with the result that assembly of the container blank to a finished container is made very difficult and the final appearance is adversely affected. As the mat is cut to its final shape, it is firmly cemented to the bed 10.

As illustrated in the drawings, a single container blank of the folding type is shown but it will be understood that this invention is equally applicable to the cutting and scoring of a plurality of such folding container blanks in a single operation. After cutting mat 19 to the desired shape and attaching it firmly to bed 10, plastic sheet 15 is placed upon the upper surface of mat 19 with parts of sheet 15 extending out over bed 10 and making flat contact therewith. Sheet 15 is held firmly in proper position by retaining stops 11. In carrying out the cutting and scoring operation, head 12 and bed 10 are moved relatively together so that the cutting edges 16 of cutting blades 13 bear against plastic sheet 15 along cutting lines 21 and the scoring edges 17 of scoring blades 13 bear against plastic sheet 15 along folding lines 20. Upon the application of additional pressure causing head 12 and bed 10 to continue to move relatively together, the cutting edges 16 of cutting blades 13 will penetrate plastic sheet 15 along the lines 21 and this will cause a clean cut separation thereof. At the same time scoring edges 17 of scoring blades 14 bear further against sheet 15 along folding lines 20. Due to the presence of thin, flexible, resilient mat 19, the scoring edges 17 do not penetrate sheet 15, but instead cause a deformation of the plastic material along folding lines 20 and at the same time cause a bending of the plastic sheet along the scoring lines. The elasticity of mat 19 acts as a cushion and absorbs and distributes the pressure exerted by scoring blade 14 along folding lines 20 so as not only to prevent peneration of the plastic sheet but also to prevent cracks from developing in the plastic material along the folding lines 20, not only during the scoring operation but also in the later folding operation when the container blank is set up at which time a further bending is carried out in the same direction as that initiated by the slight bending at the time of scoring. It will be understood by those skilled in the art that either the head or the bed may be held in a fixed position or both may be movable.

Upon the completion of the cutting and scoring operation, head 12 and bed 10 are moved relatively apart so as to permit removal of the newly formed blank or blanks and insertion of a new plastic sheet.

It is to be understood that the apparatus and process of the invention, herein shown and described, is to be taken as a preferred example of the same, and that various changes in the shape, size and arrangement of parts or utilization thereof in the process, may be resorted to, without departing from the spirit of the invention, or the scope of the appended claims.

Having thus described my invention, I claim:

1. Apparatus for cutting and scoring blanks comprising a pair of die members movable toward and away from one another, means for moving said die members toward and away from one another, blank cutting and scoring blades on a first one of said die members, a rigid substantially non-yieldable plate on the second die member opposite the cutting and scoring blades of the first member, and a sheet of yieldable rubber forming a cushion on said non-yieldable plate opposite the scoring blades of the first member, said yieldable rubber sheet being restricted as to size and shape to those portions of the non-yieldable plate which are removed from the portions confronting said cutting blades, and being in such position that it is depressible upon approach of the scoring blades to the bed member.

2. The apparatus defined in claim 1, further characterized by the fact that the yieldable rubber sheet has a continuous plane face.

3. Apparatus for cutting and scoring blanks comprising opposed head and bed members movable relative to one another, cutting blades on said head member defining the borders of a blank, said cutting blades being opposite said bed member, scoring blades also on said head member wholly within the borders defined by said cutting blades, a sheet of resilient material on said bed member and disposed between the scoring blade and bed member in the course of their relative movement and depressible upon approach of the scoring blades to the bed member, said resilient sheet also being wholly within the borders defined by said cutting blades when the head and bed members are brought together, and means for effecting the relative movement of said head and bed members to separate them and bring them together.

JOHN SHIPLEY TROTH.

REFERENCES CITED

The following references are of record in the file of this patent:

UNITED STATES PATENTS

| Number | Name | Date |
|---|---|---|
| 1,080,759 | Gruenberg | Dec. 9, 1913 |
| 1,189,073 | Driver | June 27, 1916 |
| 1,289,679 | Craig | Dec. 31, 1918 |
| 1,340,558 | Plummer | May 18, 1920 |
| 1,367,675 | Tibbitts | Feb. 8, 1921 |
| 1,724,358 | Messer | Aug. 13, 1929 |
| 1,751,451 | Smith | Mar. 18, 1930 |
| 2,043,432 | Flood | June 9, 1936 |
| 2,294,020 | Breth et al. | Aug. 25, 1942 |
| 2,524,962 | Dalsemer | Oct. 10, 1950 |